April 21, 1936.　　　J. C. McCUNE　　　2,038,184
COMPRESSOR CONTROL DEVICE
Filed Jan. 11, 1934
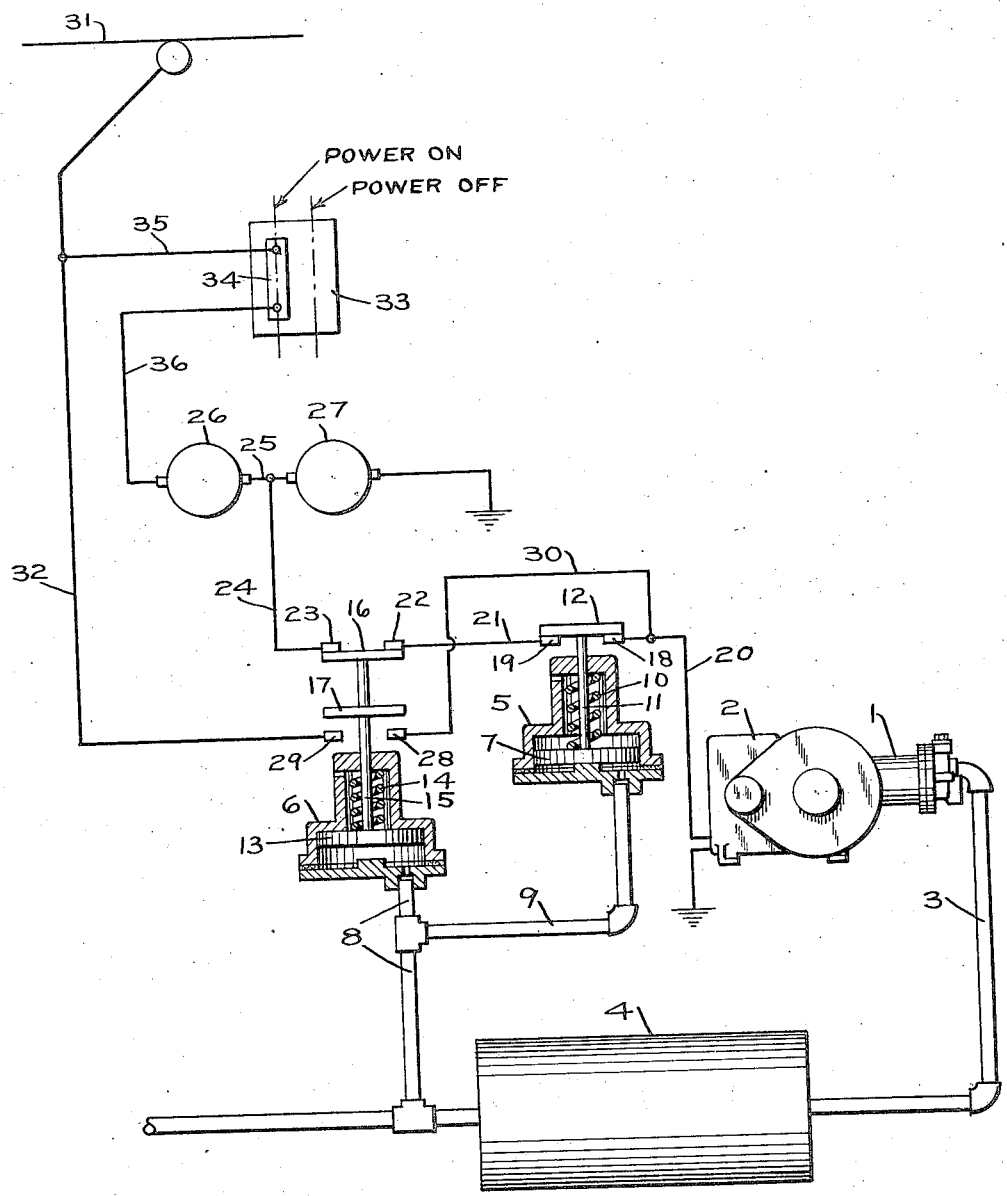
INVENTOR
JOSEPH C. McCUNE
BY　Wm. M. Cady
ATTORNEY Patented Apr. 21, 1936

2,038,184

UNITED STATES PATENT OFFICE 2,038,184

COMPRESSOR CONTROL DEVICE

Joseph C. McCune, Edgewood, Pa., assignor to The Westinghouse Air Brake Company, Wilmerding, Pa., a corporation of Pennsylvania Application January 11, 1934, Serial No. 706,228

13 Claims. (Cl. 303—1)

This invention relates to apparatus employed on electric traction vehicles for compressing fluid for use in controlling the fluid pressure brakes.

On vehicles equipped with a fluid compressor, a governor device is provided which is adapted, upon a predetermined reduction in pressure in the main or storage reservoir, to effect the starting of the compressor. When the compressor is thus started, it continues to operate at a substantially constant speed until the main reservoir pressure has been increased to a predetermined maximum degree, at which time the governor operates to effect the stopping of the compressor. The running of the compressor is apt to be noisy to such an extent as to be disagreeable and annoying, especially when the vehicle is standing.

The principal object of this invention is to reduce the operating noise of the compressor by providing automatic means for causing the compressor to run at a low speed when the vehicle is being propelled, which speed is sufficiently fast to normally insure an adequate supply of fluid under pressure for controlling the fluid pressure brakes, and for preventing the compressor from operating while the vehicle is standing, or unless the main reservoir pressure has been reduced to a very low degree, at which time the compressor will run at full speed, so as to quickly charge the storage reservoir.

In the accompanying drawing, the single figure is a diagrammatic view of a control system, embodying my invention, for a motor of a fluid compressor.

As shown in the drawing, the control system may comprise a fluid compressor 1 adapted to be driven by an electric motor 2 and adapted to compress fluid through a pipe 3 into a main or storage reservoir 4, a normal compressor governor device 5 and an additional compressor governor device 6.

The normal governor device 5 is shown diagrammatically as comprising a casing containing a piston 7, subject on one side to the pressure of fluid as supplied from the main reservoir 4 through pipes 8 and 9, subject on the opposite side to the pressure of a spring 10. The piston 7 carries a stem 11 having secured thereto a contact member 12 which is operable by the piston to control a circuit leading to the compressor motor 2. Said contact member is adapted, when the piston is in its inner position, to close a circuit leading to the compressor motor and to open the circuit when the piston is moved outwardly.

The governor device 6 comprises a piston 13 subject on one side to the pressure of fluid as supplied from the main reservoir 4 through pipe 8, and subject on the other side to the pressure of a spring 14. The piston 13 is provided with a stem 15 carrying the contact members 16 and 17 which are operable by the piston to also control circuits leading to the compressor motor 2. The contact member 16 is adapted, when the piston is in its outer position, to close the circuit to the compressor motor which circuit includes the contact member 12, and to open said circuit and close another circuit to the compressor motor independent of the contact member 12 when the piston is in its inner position.

The contact member 12 is associated with fixed contacts 18 and 19, the contact 18 being connected to wire 20 leading to the compressor motor 2 and contact 19 being connected by wire 21 to a fixed contact 22 associated with the contact member 16. The other contact 23 associated with the contact member 16 is connected by wire 24 to wire 25, which wire 25 connects the car motor 27 in series with the car motor 26. The contacts 28 and 29 are adapted to be engaged by the contact member 17, the contact 28 being connected by wire 30 to wire 20 and the contact 29 being connected to the trolley wire 31 by wire 32.

In operation, assume that the governor device 5 is adjusted for controlling the compressor motor 2 within the usual maximum and minimum pressure range as ordinarily employed and that the governor device 6 is adjusted so that the piston will not move to its inner position until the pressure in the main reservoir 4 has been reduced to a relatively low degree, which is considerably lower than the pressure at which the governor device 5 operates to cut in the compressor motor but which is sufficient to insure ample main reservoir pressure for operating the brakes to hold the car while standing.

With the usual power controller drum 33 in a power on position, the contact 34 on the controller drum 33 closes a circuit from the trolley wire 31 to the car motors 26 and 27, which circuit includes the wire 32, wire 35, contact 34, wire 36 and wire 25. Thus current is supplied to the car motors for propelling the car. It will be understood that the controller is shown diagrammatically and for the purpose of illustration is shown as having only one power on position, in which position one electric circuit is established for controlling the car motors whereas, in reality, the usual controller is provided with a plurality of power on positions for controlling the car motor circuits.

With the wire 25 thus energized and the switch piston 13 in its outer position so that the contact member 16 connects the contacts 23 and 22, the governor device 5 controls the supply of current to the compressor motor 2. With the pressure of the fluid in the main reservoir 4 lower than the cutting-out pressure of the governor, the piston 7 is in its inner position, as shown in the drawing, so that the contact member 12 closes a circuit from the wire 25 to the compressor motor 2 through wire 24, contacts 23 and 22, contact member 16, wire 21, contacts 19 and 18, contact member 12 and wire 20. Due to the drop in voltage across the car motor 26, the voltage of the current supplied to wire 25, and thereby to the compressor motor, is considerably reduced, with the result that the compressor motor runs at a low speed.

If the car is to be brought to a stop, the power controller drum is shifted to off position, thereby causing the contact 34 to break the connection from wire 35 to wire 36 and thereby open the circuit to the car motors 26 and 27 and consequently the above mentioned circuit to the compressor motor.

When the pressure in the main reservoir 4 has been reduced to a predetermined low degree, the piston 13 in the governor device 6 will move to its inner position so as to cause the contact member 17 to engage the contacts 28 and 29. A circuit is thus established from the trolley wire 31 to the compressor motor 2 through wire 32, contacts 29 and 28, the contact member 17 and wires 30 and 20. Thus, current at full voltage is supplied to the compressor motor, with the result that said motor will run at full speed and quickly charge the main reservoir.

It will be noted that the movement of the piston 13 to its inner position causes the contact member 16 to be moved out of engagement with the contacts 22 and 23. If said contact member were not moved out of engagement with said contacts and the contact members 17 and 12 were in their circuit closing positions, then current supplied to wire 20, as above mentioned, would flow to the car motor 27 through contacts 18 and 19, contact member 12, wire 21, contacts 22 and 23, contact member 16, and wires 24 and 25, thereby causing unintended operation of said car motor. With the contact member 16 out of engagement with the contacts 22 and 23, however, this flow of current is prevented.

It will be seen from the foregoing that when the power controller is in power on position for causing the car to be propelled, current at less than full voltage is adapted to be supplied to the compressor motor, the circuit to said motor being controlled at this time by the normal governor device so as to maintain the pressure in the main reservoir within the pressure range of said governor, and when supplied with this low voltage current, the compressor will run at low speed. It will further be seen that when the car is standing, the compressor remains idle, unless the main reservoir pressure should fall to the low degree at which the low pressure governor device is adjusted to operate, and when said governor device operates, it closes a circuit through which current at full voltage is supplied to the compressor motor, with the result that said motor then operates at full speed so as to quickly charge the main reservoir.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a plurality of series connected electric motors, a power controller for said motors having power on and power off positions, a fluid compressor and an electric motor for actuating said compressor, of means operative in a power on position of said controller to connect said actuating motor to the circuit including said series connected motors at a point intermediate two of said motors for supplying current at one voltage to said actuating motor, and means operated upon a fall in the pressure of the fluid compressed by said compressor to a predetermined degree for supplying current at a higher voltage to said actuating motor.

2. The combination with a plurality of series connected electric motors, a power controller for said motors having power on and power off positions, a fluid compressor, and an electric motor for actuating said compressor, of means operated upon a fall in the pressure of the fluid compressed by said compressor to a predetermined degree when said controller is in a power on position to connect said actuating motor to the circuit including said series connected motors at a point intermediate two of said motors for supplying current at one voltage to said actuating motor, and means operated upon a fall in the pressure of fluid compressed by the compressor to a predetermined degree for supplying current at a higher voltage to said actuating motor.

3. The combination with a plurality of series connected electric motors, a power controller for said motors having power on and power off positions, a fluid compressor, and an electric motor for actuating said compressor, of means operative when said controller is in a power on position and the pressure of the fluid compressed by said compressor is reduced to a predetermined degree, to connect said actuating motor to the circuit including said series connected motors at a point intermediate two of said motors for supplying current at one voltage to said actuating motor, and means operative to supply current at a higher voltage to said actuating motor when the pressure of the fluid compressed by said compressor is reduced to a predetermined pressure less than the pressure at which the first mentioned means operates to supply current to said actuating motor.

4. The combination with a plurality of series connected electric motors, a power controller for said motors having power on and power off positions, a fluid compressor, and an electric motor for actuating said compressor, of a compressor governor device including a switch adapted to connect said actuating motor to the circuit including said series connected motors at a point intermediate two of said motors for supplying current at one voltage to said actuating motor when said controller is in a power on position, said governor being operated by variations in the pressure of the fluid compressed by said compressor for opening and closing said switch, and an additional compressor governor device including a switch adapted to close a circuit to said actuating motor for supplying current at a higher voltage to said actuating motor upon a fall in the pressure of the fluid compressed by said compressor to a predetermined pressure less than the pressure at which the first mentioned governor device operates to close the first mentioned switch.

5. The combination with a plurality of series connected electric motors, a power controller for said motors having power on and power off positions, a fluid compressor, and an electric motor for actuating said compressor, of a high pressure compressor governor including a switch adapted to connect said actuating motor to the circuit including said series connected motors at a point intermediate two of said motors, said governor being operated upon a reduction in the pressure of the fluid compressed by said compressor to a predetermined degree to close said switch for supplying current at one voltage to said actuating motor when said controller is in a power on position, and a low pressure governor including switch means in series with said switch and also including other switch means, said low pressure governor being operative to maintain the first mentioned switch means in closed position and the second mentioned switch means in open position at a predetermined low pressure of the fluid compressed by said compressor less than the pressure at which said high pressure governor operates to open the circuit to said actuating motor, said low pressure governor being also operative upon a reduction in the pressure of the fluid compressed by said compressor to a predetermined pressure less than the pressure at which said high pressure governor operates to open the circuit to said actuating motor, to move the second mentioned switch means to closed position for closing a circuit for supplying current at a higher voltage to said actuating motor and to move the second mentioned switch means to open position for preventing current thus supplied to said actuating motor from flowing to said series connected motors.

6. In combination, a vehicle having a driving motor, a power controller for said motor having power on and power off positions, a compressor, a motor for driving said compressor, a first circuit for supplying current at one voltage to said compressor motor when the power controller is in the power on position, a second circuit for supplying current at a higher voltage to said compressor motor irrespective of the position of the power controller, and means responsive to the pressure of the fluid compressed by the compressor and controlling said second circuit.

7. In combination, a vehicle having a driving motor, a power controller for said motor having power on and power off positions, a compressor, a motor for driving said compressor, a first circuit for supplying current at one voltage to said compressor motor when the power controller is in the power on position, means responsive to the pressure of the fluid compressed by the compressor and controlling said circuit, a second circuit for supplying current at a higher voltage to said compressor motor irrespective of the position of the power controller, and means responsive to the pressure of the fluid compressed by the compressor and controlling said second circuit.

8. In combination, a vehicle having a driving motor, a power controller for said motor having power on and power off positions, a compressor, a motor for driving said compressor, a first circuit for supplying current at one voltage to said compressor motor when the power controller is in the power on position, means responsive to the pressure of the fluid compressed by the compressor and controlling said circuit and operable on a reduction in the pressure of said fluid to a predetermined value to complete said circuit, a second circuit for supplying current at a higher voltage to said compressor motor irrespective of the position of the power controller, and means responsive to the pressure of the fluid compressed by the compressor and controlling said second circuit and operable on a reduction in the pressure of said fluid to a value lower than said predetermined value to complete said circuit.

9. In combination, a vehicle having a driving motor, a power controller for said motor having power on and power off positions, a compressor, a motor for driving said compressor, a first circuit for supplying current at one voltage to said compressor motor when the power controller is in the power on position, a second circuit for supplying current at a higher voltage to said compressor motor irrespective of the position of the power controller, and means responsive to the pressure of the fluid compressed by the compressor and controlling said second circuit and for interrupting said first circuit.

10. In combination with a vehicle having a driving motor, a power controller for said motor having power on and power off positions, a compressor, a motor for driving said compressor, a first circuit for supplying current to said compressor motor to effect operation of the compressor at one speed when the power controller is in the power on position, a second circuit for supplying current to said compressor motor irrespective of the position of the power controller to effect operation of the compressor at a higher speed, and means responsive to the pressure of the fluid compressed by the compressor and controlling said second circuit.

11. In combination with a vehicle having a driving motor, a power controller for said motor having power on and power off positions, a compressor, a motor for driving said compressor, a first circuit for supplying current to said compressor motor to effect operation of the compressor at one speed when the power controller is in the power on position, means responsive to the pressure of the fluid compressed by the compressor and controlling said first circuit, a second circuit for supplying current to said compressor motor irrespective of the position of the power controller to effect operation of the compressor at a higher speed, and means responsive to the pressure of the fluid compressed by the compressor and controlling said second circuit.

12. The combination with a vehicle having a driving motor and a power controller for said motor having power on and power off positions, a compressor and a driving motor for said compressor, of means operative when said controller is in a power on position and the pressure of the fluid compressed by the compressor is reduced to a predetermined degree to supply current to the compressor motor to effect operation of the compressor motor at one speed, and means operable when said power controller is in the power off position and the pressure of the fluid compressed by the compressor is reduced to a pressure less than said predetermined degree to supply current to said compressor motor to effect operation of the compressor motor at a different speed.

13. The combination with a vehicle having a driving motor and a power controller for said motor having power on and power off positions, a compressor and a driving motor for said compressor, of means operative when said power controller is in the power on position and the pressure of the fluid compressed by the compressor is reduced to a predetermined degree to supply current to the compressor motor at one voltage, and means operable when said power controller is in the power off position and the pressure of the fluid compressed by the compressor is reduced to a pressure less than said predetermined degree to supply current to said compressor motor at a different voltage.

JOSEPH C. McCUNE.